(12) United States Patent
Pande et al.

(10) Patent No.: US 7,304,606 B2
(45) Date of Patent: *Dec. 4, 2007

(54) MODE DETERMINATION FOR MOBILE GPS TERMINALS

(75) Inventors: Ashutosh Pande, San Jose, CA (US); Lionel Jacques Garin, Palo Alto, CA (US); Steve Chang Chiayee, San Jose, CA (US); Gengsheng Zhang, Cupertino, CA (US); Randall J. Silva, Monument, CO (US)

(73) Assignee: SiRF Technology, Inc., San Jose, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 10/760,607

(22) Filed: Jan. 17, 2004

(65) Prior Publication Data

US 2005/0162310 A1 Jul. 28, 2005

(51) Int. Cl.
*G01S 5/14* (2006.01)
*G01C 21/26* (2006.01)

(52) U.S. Cl. .............................. 342/357.09; 342/357.1; 455/456.6

(58) Field of Classification Search ........... 342/357.09, 342/357.1; 455/456.1, 456.6; 701/213
See application file for complete search history.

(56) References Cited

U.S. PATENT DOCUMENTS

| 5,663,734 | A | * | 9/1997 | Krasner | 342/357.12 |
| 5,928,306 | A | * | 7/1999 | France et al. | 701/207 |
| 5,982,324 | A | * | 11/1999 | Watters et al. | 701/213 |
| 6,229,478 | B1 | * | 5/2001 | Biacs et al. | 342/357.09 |
| 6,353,412 | B1 | * | 3/2002 | Soliman | 342/457 |
| 6,462,708 | B1 | * | 10/2002 | Tsujimoto et al. | 342/357.09 |
| 6,703,971 | B2 | * | 3/2004 | Pande et al. | 342/357.09 |
| 2002/0019698 | A1 | * | 2/2002 | Vilppula et al. | 701/213 |
| 2002/0082774 | A1 | * | 6/2002 | Bloebaum | 701/213 |
| 2002/0145560 | A1 | * | 10/2002 | Tsujimoto et al. | 342/357.09 |

FOREIGN PATENT DOCUMENTS

KR 2001045472 A * 6/2001

* cited by examiner

*Primary Examiner*—Thomas H. Tarcza
*Assistant Examiner*—Fred H. Mull
(74) *Attorney, Agent, or Firm*—The Eclipse Group LLP

(57) ABSTRACT

The present invention discloses a system for determining the position of a GPS terminal. The system comprises a GPS terminal, a location aiding server, and a communications system. Messages are passed between the GPS terminal and the server, as well as within the GPS terminal, to determine the mode of operation of the GPS portion of the system. Decisions are made based on availability of aiding data and Quality of Service requirements.

14 Claims, 3 Drawing Sheets

MODE DETERMINATION FOR MOBILE GPS TERMINALS

CROSS-REFERENCE TO RELATED APPLICATIONS

This application claims priority of U.S. patent Ser. No. 10/082,541, filed on Feb. 21, 2002, titled "MODE DETERMINATION FOR MOBILE GPS TERMINAL", issued as U.S. Pat. No. 6,703,971 B2, that claims priority under 35 U.S.C. §119(e) of U.S. Provisional Patent Application No. 60/270,682 filed on Feb. 21, 2001, titled "MODE DETERMINATION FOR MOBILE GPS TERMINAL," by Ashutoshy Pande, et al., which are incorporated by reference herein.

BACKGROUND OF THE INVENTION

1. Field of the Invention

The present invention relates in general to Global Positioning System (GPS) mobile terminals, and in particular to methods and apparatuses for determining the mode of operation of a GPS receiver in a mobile terminal or device.

2. Description of the Related Art

Cellular telephony, including Personal Communication System (PCS) devices and other mobile terminals or devices, has become commonplace. The use of such devices to provide voice, data, and other services, such as internet access, has provided many conveniences to cellular system users. Further, other wireless communications systems, such as two-way paging, trunked radio, Specialized Mobile Radio (SMR) that is used by police, fire, and paramedic departments, have also become essential for mobile communications.

A current thrust in the cellular and PCS arena is the integration of Global Positioning System (GPS) technology into cellular telephone devices and other wireless transceivers. For example, U.S. Pat. No. 5,874,914, issued to Krasner, which is incorporated by reference herein, describes a method wherein the basestation (also known as the Mobile Telephone Switching Office (MTSO)) transmits GPS satellite information, including Doppler information, to a remote unit using a cellular data link, and computing pseudoranges to the in-view satellites without receiving or using satellite ephemeris information.

This current interest in integrating GPS with cellular telephony stems from a new Federal Communications Commission (FCC) requirement that cellular telephones be locatable within 50 feet once an emergency call, such as a "911" call (also referred to as "Enhanced 911" or "E911") is placed by a given cellular telephone. Such position data assists police, paramedics, and other law enforcement and public service personnel, as well as other agencies that may need or have legal rights to determine the cellular telephone's position. Further, GPS data that is supplied to the mobile telephone can be used by the mobile telephone user for directions, latitude and longitude positions (locations or positions) of other locations or other mobile telephones that the cellular user is trying to locate, determination of relative location of the cellular user to other landmarks, directions for the cellular user via internet maps or other GPS mapping techniques, etc. Such data can be of use for other than E911 calls, and would be very useful for cellular and PCS subscribers.

However, cellular telephones are typically used in environments that are typically not suitable for GPS signal reception, e.g., indoors, in urban environments, or in tunnels or elevators. As such, there are many situations where a cell phone that has an integrated GPS receiver cannot receive GPS signals, because the cell phone is blocked from receiving such signals. Urban canyons, heavy foliage, or other scattering or blocking structures will prevent the receiver from getting the information it needs to determine the location of the cell phone. The cellular system can then be used to deliver information to the GPS receiver for the GPS receiver to perform the necessary calculations.

It can be seen that there is a need in the art for GPS enabled cellular telephones. It can also be seen that there is a need in the art for decision making intelligence accessible to the GPS receiver for determining whether the GPS receiver requires additional information in order to make a position determination.

SUMMARY OF THE INVENTION

To minimize the limitations in the prior art described above, and to minimize other limitations that will become apparent upon reading and understanding the present specification, the present invention discloses a system for determining the position of a GPS terminal.

In summary, the present invention discloses a system for determining the position of a GPS terminal. The system comprises a GPS terminal, a location aiding server, and a communications system. The GPS terminal includes a GPS section for receiving and processing a GPS signal, and a call processing section, where a first message is passed from the call processing section to the GPS section via an interface between the GPS section and the call processing section, and a second message is also passed via the interface from the GPS section to the call processing section in response thereto. The first message comprises a Quality of Service (QoS) message and the second message comprises a QoS response message.

An object of the present invention is to provide for GPS enabled cellular telephones. Another object of the present invention is to provide a system that provides decision making intelligence accessible to the GPS receiver for determining whether the GPS receiver requires additional information in order to make a position determination.

BRIEF DESCRIPTION OF THE DRAWINGS

Referring now to the drawings in which like reference numbers represent corresponding parts throughout.

DETAILED DESCRIPTION OF THE DRAWINGS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

When integrating GPS components with wireless communications systems, the GPS system must have the capability to acquire and track the GPS satellites under the conditions that the typical wireless communications system user will encounter. Some of those conditions, e.g., indoor use, dense urban areas use that has a limited sky view, such as in downtown areas with skyscrapers blocking satellite views, etc., are possible with terrestrial-based wireless communications systems but present difficult situations for GPS systems. Traditional standalone mode GPS, e.g., where the GPS receiver does not receive any outside assistance, has problems with long Time To First Fix (TTFF) times, and also has limited ability to acquire the GPS satellite signals under indoor or limited sky view conditions. Even with some additional information, TTFF times can be over thirty seconds because ephemeris data must be acquired from the GPS system itself, and also requires a strong signal to acquire such information reliably. These requirements of the GPS system have impacts on the reliability of position availability as well as power consumption in handheld GPS terminals.

Overview of the Present Invention

In the present invention, a server-client (or server-terminal) architecture is used. The terminal-side user has a GPS terminal, such as a cellular phone, and directly accesses to the terminal via a user interface section of the terminal. The server-side user can access the server via a user interface section of the server or from a user terminal via a network Accordingly, a positioning request from a user needs to be received at both the terminal and the server. Furthermore, notice of a positioning result to a user needs to be made to both the terminal-side user and the server-side user.

GPS Architecture

Figure 1:
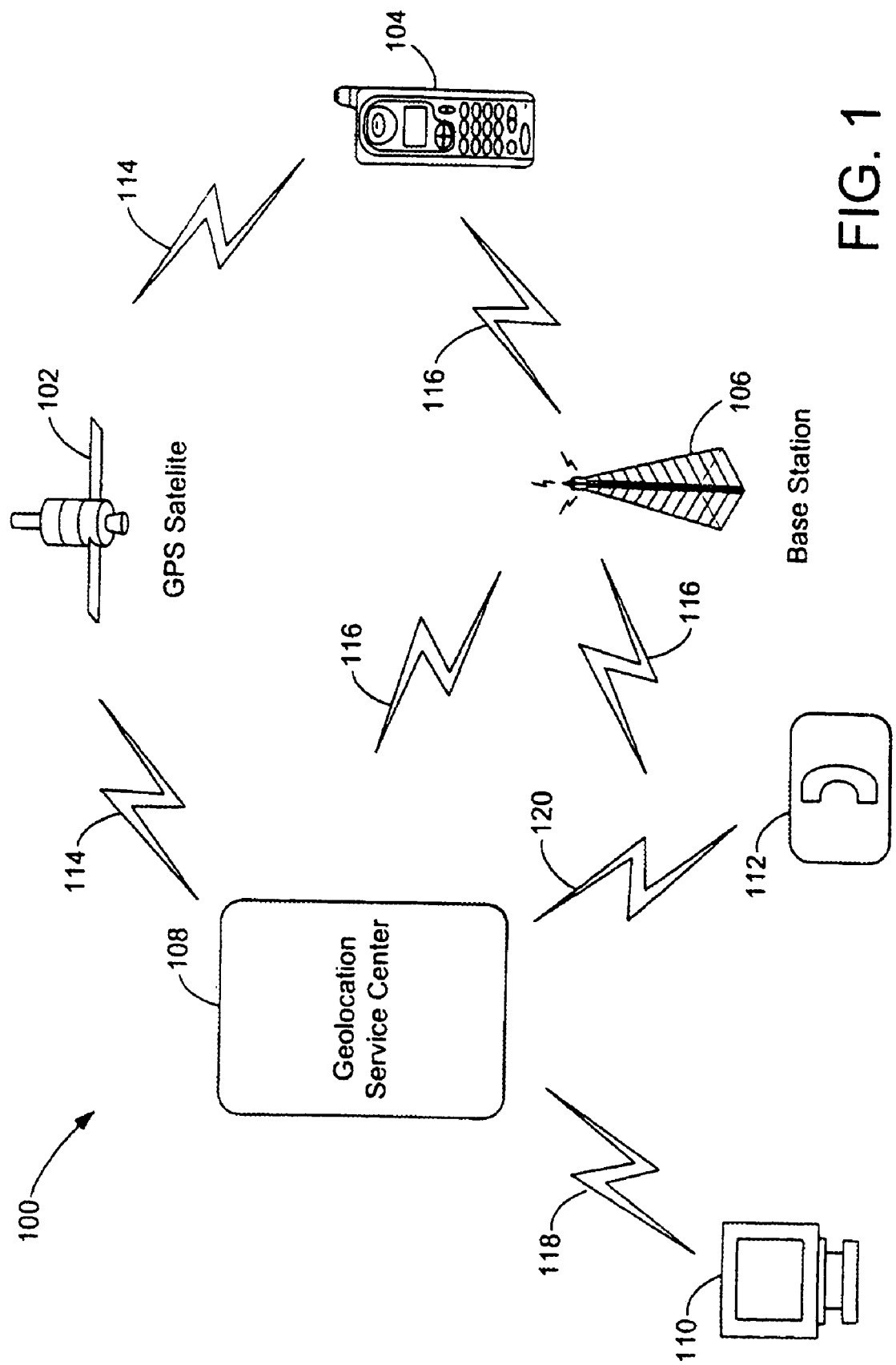
FIG. 1 illustrates a typical GPS architecture as used in a cellular environment

FIG. 1 illustrates a typical GPS architecture as used in a cellular environment.

The wireless handset location technology of the present invention uses GPS technology in support of various wireless handset devices for the implementation of E911 and geo-location services. By taking the advantage of the low cost, low power, high performance and high accuracy GPS receivers enabled by the present invention, as well as the wireless network communication services, the wireless handset location technology of the present invention provides highly reliable and economical solutions to the Wireless Aided GPS.

The wireless handset location technology of the present invention supports all kinds of geo-location services, from fully standalone mode, network aided mode, to network based service mode, to other modes. The technology of the present invention also accommodates wide range of wireless communication platforms, including CDMA, TDMA, AMP, and even pager systems. FIG. 1 portrays the concept of wireless handset location technology.

System 100 illustrates a GPS satellite 102, which is illustrative of the constellation of GPS satellites 102 that are in orbit, a wireless GPS terminal 104 that comprises a GPS receiver, a base station 106, a geo-location (server) service center 108, a geo-location end application 110, and a Public Safety Answering Point (PSAP) 112.

The GPS satellite 102 transmits spread spectrum signals 114 that are received at the wireless GPS terminal 104 and the geo-location server 108. For ease of illustrative purposes, the other GPS satellites 102 are not shown, however, other GPS satellites 102 also are transmitting signals 114 that are received by the wireless GPS terminal 104 and the geo-location server 108. If the wireless GPS terminal 104 can receive a strong enough signals 114, the GPS receiver in the wireless GPS terminal 104 can compute the position of the wireless GPS terminal 104 as is typically done in the GPS system. However, wireless GPS terminals are typically not able to receive strong enough signals 114, or are not able to receive signals from enough GPS satellites 102 to autonomously compute the position of the wireless GPS terminal 104, but can still communicate with the base station 106. Thus, the base station 106 can communicate information via signals 116 to the GPS terminal 104 to allow the GPS terminal 104 to compute the location. If the basestation 106 is transferring information to the GPS terminal 104 to allow the GPS terminal 104 to compute position, it is called "wireless-aided GPS". Furthermore, the basestation 106 can communicate aiding data from the geolocation server 108 to the GPS terminal 104 to allow the GPS terminal 104 to compute its position, or can communicate information from the GPS terminal 104 to the geo-location server 108 to allow the geo-location server 108 to compute the position of the GPS terminal 104. When the basestation 106 transfers information from the geolocation server 108 to the GPS terminal 104 it is called "network aiding GPS", whereas when the basestation 106 transfers information from the GPS terminal 104 to the geo-location server 108 for the geo-location server 108 to compute the position of the GPS terminal 104 it is called "network-centric GPS."

The geolocation server 108 also communicates with the geolocation end application 110 via signals 118 and with PSAP 112 via signals 120. These signals 118 and 120 can either be via wireless links or can be through the land line telephone network or other wire-based networks.

The wireless GPS terminal 104 location technology of the present invention comprises two major service systems: the wireless GPS terminal 104 with the GPS receiver of the present invention and the geo-location server 108 containing the geo-location software modules of the present invention. In addition, there are two types of supporting systems: the Base Station (BS) 106 infrastructure, which provides the network information transfer mechanism, and the PSAP 112 or the application 110 system, which can initiate the geo-location network services.

Figure 2:
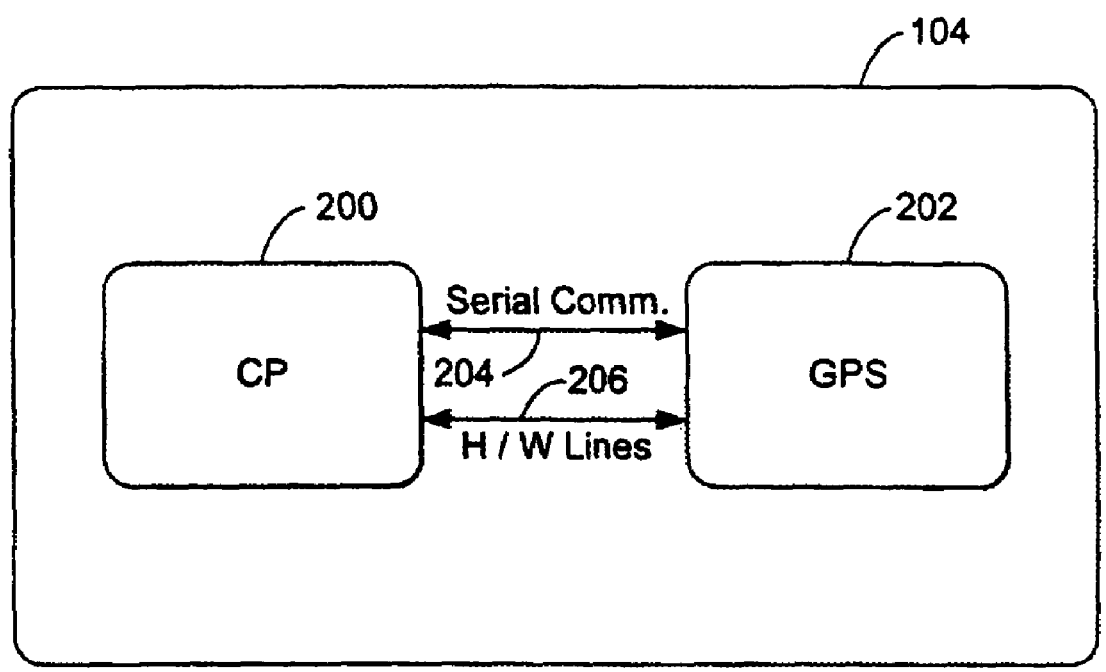
FIG. 2 shows a typical interface between the Call Processing section and the GPS section of the present invention.

FIG. 2 shows a typical interface between a Call Processing section and the GPS section of the present invention.

As shown in FIG. 2, the GPS terminal 104 comprises a Call Processing (CP) section 200 and a Global Positioning System (GPS) section 202. Within the GPS terminal 104, or, alternatively, between the GPS terminal 104 and an external accessory to the GPS terminal 104, communications between the CP section 200 and the GPS section 202 take place. These communications allow signals to be transferred from CP section 200 to GPS section 202, and typically take place on a serial communications link 204 and hardware lines 206, but other connections can be used if desired.

For example, in another implementation, the CP section 200 and the GPS section 202 can share the same digital processor and other circuitry. In such a case, the communication between sections can be made by inter-task communication, and certain data transfers, such as any time or frequency transfers between the CP section 200 and the GPS section 202, would not use the hardware lines 206, but would be internal to the circuitry or, potentially, no transfer would be required depending on the circuit design.

The GPS section 202, also known as the SiRFLoc Client (SLC) can be operated in at least two modes: a Call Processing centric (CP centric) mode or a SiRFLoc Server (SLS) centric mode. Typically, the mode is determined by the internal information available to the GPS section 202. Normally, the GPS section is started in the CP centric mode, but can be started in the SLS centric mode if desired. In the SLC centric mode, the GPS terminal 104 is operated in a standalone mode without any network connection. The GPS section 202, once in the SLS centric mode, relies on the SLS server, also known as the Geolocation service center 108 or PSAP 112, to provide network aided data for position computation by the GPS section 202. Once in the SLC centric mode, there is typically no return to the CP centric mode unless conditions change or the call processor 200 determines that the mode of the GPS section needs to be changed.

In addition to the SLC modification for CP centric operation, the air-interface protocol for the GPS terminal 104 is typically modified to optimize the message exchange between the geolocation service center 108 and the GPS terminal 104, to reduce message traffic over the network and to reduce the overall Time To First Fix (TTFF) for GPS terminal 104.

The present invention allows the GPS section 202 to provide position and satellite information to the call processor 200 in either NMEA or other format (typically binary messages, such that the call processor is able to determine which mode the GPS section 202 is operating in, or, potentially, to override the mode of operation of the GPS section 202. This allows the GPS section 202 to communicate with the call processor 200 information other than a determined position, in order for the call processor to meet Quality of Service (QoS) requirements, TTFF requirements, cost savings, or other programmed parameters that can be user selected or pre-programmed into the GPS terminal 104.

Interface and GPS Section Operation

Figure 3:
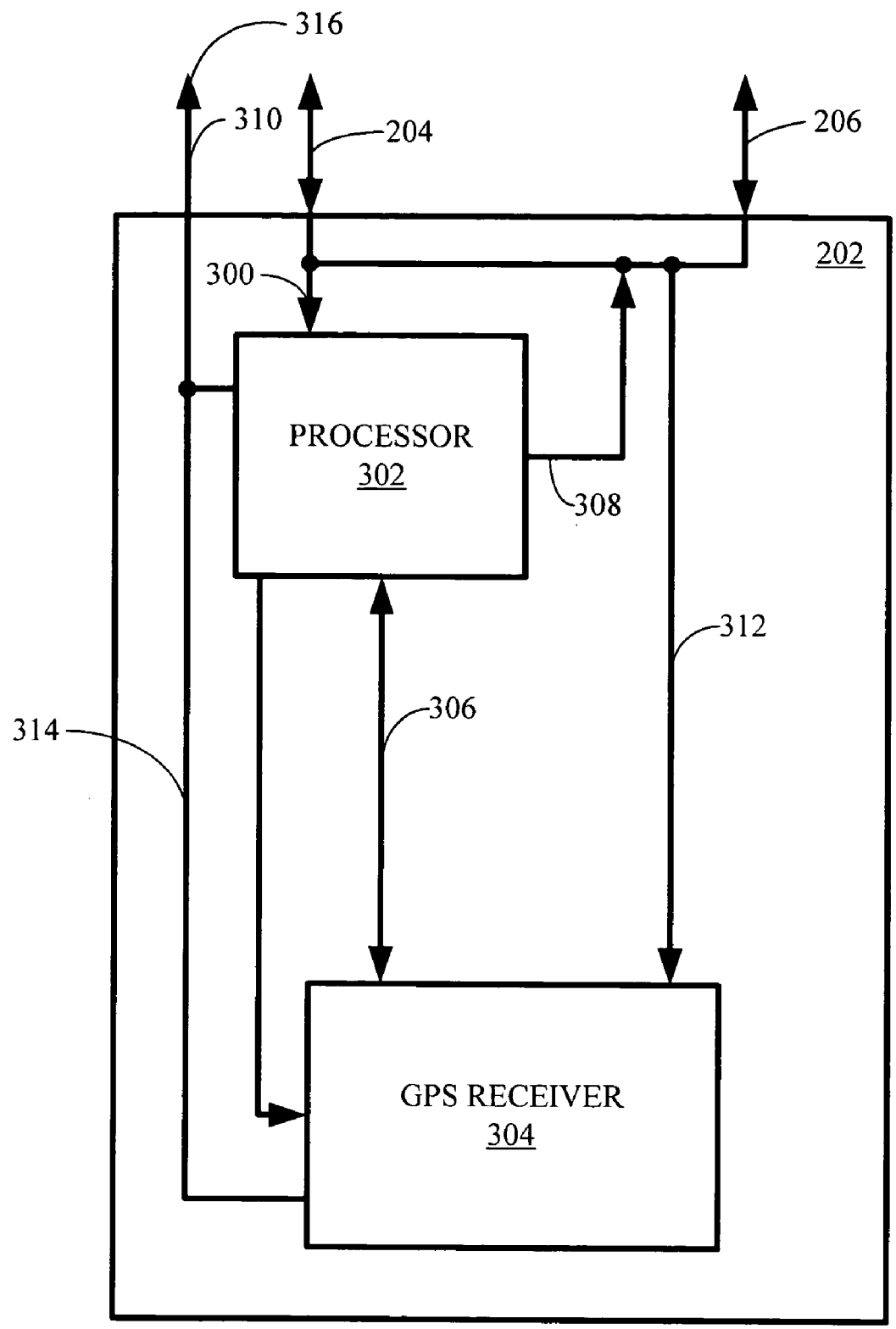
FIG. 3 illustrates the interface and GPS section operation utilizing the present invention.

FIG. 3 illustrates the interface and GPS Section operation utilizing the present invention.

Serial communications lines 204 and hardware lines 206 are shown connected to GPS section 202. Message 300 is passed to the processing section 302 of GPS section 202. Message 300 comprises a Quality of Service (QoS) request to GPS section 202, which tells GPS section 202 the time and position accuracy required by the call processing section 200 for the position data to be determined by the GPS section 202. Processing section 302 is also in communication with GPS receiver 304 via link 306, and, as such, processing section 302 knows or can calculate how long it will take GPS receiver 304 to determine a position of GPS terminal 104. Message 300 is issued by the call processor 200 as needed.

In response to the message 300 (the QoS request), the GPS section 202, after calculating or determining whether the time and accuracy requirements of message 300 can be met by GPS section 202, respond to the call processor 200 via message 308. Message 308 is reported to the call processor 200 via serial communications lines 24 or hardware lines 206, or both, as needed.

Message 308 can have several forms. The message 308 can be that the QoS requested, i.e., the position accuracy and TTFF requested by call processor 200, can be obtained by GPS section 202. As such, the CP centric mode for the GPS section 202 will be continued so long as the call processor 200 or the geolocation service center 108 does not change the mode of the GPS section 202.

The message 308 can also report that the position accuracy requested in message 300 cannot be obtained within the TTFF requested, but can be obtained eventually in a longer time period. Typically, the call processor 200 will determine whether to allow GPS section 202 to continue operating in CP centric mode, or to switch the GPS section 200 to SLS centric mode, but GPS section 202, in some embodiments, can make this determination by itself without resorting to the call processor 200.

Message 308 can also report that GPS section 202 cannot obtain the position accuracy, or potentially, no position determination at all, even after an extended period of time. If such a message 308 is determined, either the call processor 200 will switch GPS section 202 into the SIS centric mode, or the GPS section 202 will automatically switch to the SLS centric mode of operation.

Message 308 can also contain flags for aiding parameters expected or desired from geolocation service center 108, e.g., whether GPS section 202 requires time, frequency, approximate location, or ephemeris data, or any combination thereof. Each flag within message 308 would be set to a true value if that aiding parameter is required or desired by the GPS section 202, otherwise, the flag would be set to a false value. The GPS section 202 may issue the QoS response message 308 as needed once it received the first QoS request message 300 from the call processor 200.

The processor 302 determines the QoS Strategy of the GPS section 202. As such, the processor 302 determines what information it may need prior to position determination, or, even during position determination after a QoS message 300 request. The QoS strategy is determined by the presence or absence of satellite signals, e.g., the number of satellites from which signals are being received, a frequency range used for searching for satellites, a time range used for searching for satellites, and a current searching status of the GPS section 202, as well as other factors.

As such, the processor 302 initializes the GPS section 202 with information received from the call processor 200. The processor 302 section of the GPS section 202 requests information from the call processor, e.g., hardware configuration information, etc., as well as approximate GPS mobile terminal 104 position, from the call processor 200. Call processor 200 either sends a stored mobile terminal 104 position to the GPS section 202 if such a stored position is available, or, if there is no stored information available, the call processor sends a "reject" message or a "data not available" message.

The call processor 200 then sends a session open request to the GPS section 202 to start a position determination in a GPS standalone mode, ie., where there are no aids or assist messages to the GPS section 202 for position determination. After the GPS section 202 has started to receive GPS signals from GPS satellites 102 and potentially started determining the position of mobile terminal 104, the call processor 200 sends message 300 to GPS section 202 to determine the QoS that the GPS section 202 can meet. If the standard QoS message 300 request cannot be met by GPS section 202, either processor 300 or call processor 200 can determine, based on the content of message 308, whether the QoS that can be delivered by GPS section 202 is acceptable. Otherwise, either call processor 200 or processor 302 can change the mode of operation of GPS section 202 to another mode to be able to deliver the desired QoS. The call processor 200 sends message 300 to GPS section whether or not the position determination being performed by GPS section 202 is completed or not. Although GPS section 202 may receive message 300 during or after acquisition of GPS satellites 102, call processor 200 mayor may not receive message 308 before a position determination has been made by GPS section 202.

The starting mode for GPS section 202 is determined based on the information obtained from stored information, e.g., information stored in RAM or the known accuracy of clocks used by the GPS section 202, as well as any initial information received from the call processor 200 or the geolocation service center 108. The GPS section 202 then can compute what aiding data, if any, is needed, as well as having the capability for reporting QoS capabilities of GPS section 202 to call processor 200. Table 1 illustrates what data is used to determine the startup mode for GPS section 202.

TABLE 1

Start up mode determination

| Battery Backed Up RAM Parameters | Snap Start | Hot Start | Warm Start | Cold Start |
|---|---|---|---|---|
| Time T < 3 min | X | | | |
| T > 3 min | | X | X | |
| Valid Location | X | X | X | |
| Valid Ephemeris < 2 hrs | X | X | | |
| Valid SV State Table | X | | | |
| Any parameter is not valid (invalid checksum in RAM, Ephemeris > 2 hrs) | | | | X |

Acquisition State

At the beginning of the Acquisition of GPS satellites 102, the GPS section 202 sends message 308 to call processor 200. During this state of acquisition of GPS satellites, GPS section 202 is typically in the CP centric mode, following a CP centric strategy algorithm determined by the GPS section 202. At the end of the acquisition state of the GPS section 202, GPS section 202 will have additional information regarding whether aiding information is required from either the call processor 200 or the geolocation service center 108, and what, if any, types of aiding information is required.

Tracking State

When GPS section 202 is tracking GPS satellites 102, i.e., when a satellite 102 signal 114 has been received and the data from the signal has been retrieved, GPS section 202 can determine whether the message 308 previously sent during acquisition state is still valid, or if another message 308 needs to be sent to update the QoS available from the GPS section 202. For example, if GPS section 202 has only acquired one or two GPS satellites 102, and is tracking those GPS satellites 102 then GPS section 202 may not have enough information to determine a position for mobile terminal 104. While in tracking mode, the GPS section will continue to run the CP centric strategy unless network aiding is required. If the system ever switches to SLS centric mode, either the geolocation service center 108 or the GPS section 202 can calculate the position of the mobile terminal 104.

NMEA/SiRF Binary Interface

As part of the features specific for the present invention, the GPS section 202 can also provide a minimum set of data listed in NMEA Specification 0183, version 2.1 dated Oct. 14, 1995, which is incorporated by reference herein, and can supply other binary messages to the CP in parallel to the standard interface with the call processor 200. Such an interface is shown as interface 310, although the interface can also be through serial interface 204 or hardware interface 206 as desired. Further, any interfaces to the call processor 200 can be directly to the GPS receiver 304 through links 312 and 314 if desired.

Typically, interface 310 is on a separate port, (Port B), with a baud rate of 100 bits per second (bps) or higher, with the following NMEA messages:

GGA: user position data—time, position (longitude, latitude) and fix related data.

VTG: Course Over Ground (COG) and Speed Over Ground (SOG).

GSV: SV in view—number of SVs, elevation, azimuth and SNR.

GSA: GPS DOP and active SV—GPS operating mode, SV used in NAV solution and DOP (PDOP, HDOP, VDOP) values.

Some proprietary messages, typically sent in binary format, are as follows:

Measured Navigation Data Message (message ID #2): handset position information and quality indicators (similar to GGA and VTG of NMEA).

Measured Tracker Data Message (message ID #4): GPS time, number of SVs, azimuth, elevation, tracking state C/NO (similar to GSV of NMEA)

Operation

Typically, the call processor 202 sends to GPS section 202 a binary (possibly a proprietary binary message to enable the message via link 310. Such a message 316 will be output at a specified baud rate. The call processor 200 can send this message to the GPS section 202 at anytime, or as needed, to switch from one message type to another, or to enable or disable the link 310. When GPS section 202 computes a position, GPS section 202 sends a message 316, either an NMEA or binary message to the call processor 200 via port 310. The GPS section 202 also sends a GSA message described above if the NMEA message 316 is used.

Over-the-Air Message Regrouping

Similarly, a message from the geolocation service center 108 can be grouped into the message being sent from the call processor 200 to the GPS section 202 on port 310 if desired. The GPS section 202 can send an aiding data request message 310 or message 308 to specify what kind of aiding data is requested from the geolocation service center 108. Each data aiding message from geolocation service center 108 typically contains only one kind of aiding information, but can contain more if desired.

Conclusion

This concludes the description of the preferred embodiment of the invention The following paragraphs describe some alternative methods of accomplishing the same objects. The present invention, although described with respect to GPS systems, can be utilized with any Satellite Positioning System (SATPS) without departing from the scope of the present invention.

In summary, the present invention discloses a system for determining the position of a GPS terminal. The system comprises a GPS terminal, a location aiding server, and a communications system The GPS terminal includes a GPS section for receiving and processing a GPS signal, and a call processing section, where a first message is passed from the call processing section to the GPS section via an interface between the GPS section and the call processing section, and a second message is also passed via the interface from the GPS section to the call processing section in response thereto. The first message comprises a Quality of Service (QoS) message and the second message comprises a QoS response message.

The communication system, selectively transmits first data to the GPS terminal from the location aiding server and receives data from the GPS terminal to send to the location aiding server, based on the first message and the second message.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but rather by the claims appended hereto.

What is claimed is:

1. A Global Positioning System (GPS)-based positioning system, comprising:

a GPS terminal, including:

a GPS section for receiving and processing a GPS signal;

a call processing section, coupled to the GPS section via an interface, a first message being passed from the call processing section to the GPS section via the interface, and a second message is passed via the interface from the GPS section to the call processing section in response thereto, wherein the first message is a Quality of Service (QoS) message and the second message is a QoS response message; and a communication system capable of communication with a location aiding server, coupled to the GPS section and the call processing section, for selectively transmitting first data to the GPS terminal from the location aiding server and receiving data from the GPS terminal to be sent to the location aiding server, based on the first message and the second message if the QoS response message indicates that first data is required by the GPS section in order to provide a predetermined QoS, otherwise no location aiding data is employed.

2. The system of claim 1, wherein the location aiding server calculates a position of the GPS terminal based upon data received from the GPS terminal.

3. The system of claim 2, wherein the GPS section further comprises a processor separate from the call processor.

4. The system of claim 3, wherein the call processor uses a predetermined strategy to determine content of the second message.

5. The system of claim 4, wherein the predetermined strategy employed by the call processor of the GPS section is determined by at least one parameter selected from a group comprising: a signal level of received satellite signals, a number of satellites from which signals are being received, a frequency range used for searching for satellites, a time range used for searching for satellites, and a current searching status of the GPS section.

6. The system of claim 5, wherein the second message comprises a message indicating that a QoS request can be met by the GPS section.

7. The system of claim 5, wherein the second message comprises a message indicating that a QoS request can not be obtained by the GPS section and can be obtained if additional time is granted by the call processor.

8. The system of claim 7, wherein the call processor switches an operational mode of the GPS section in response to the second message.

9. The system of claim 7, wherein the GPS section switches an operational mode of the GPS section based on content of the second message.

10. The system of claim 7, wherein the location aiding server sends aiding data to the GPS section.

11. The system of claim 5, wherein the second message comprises a message indicating that a QoS request cannot be obtained by the GPS section.

12. The system of claim 11, wherein the call processor switches an operational mode of the GPS section in response to the second message.

13. The system of claim 11, wherein the GPS section switches an operational mode of the GPS section based on content of the second message.

14. The system of claim 11, wherein the location aiding server sends aiding data to the GPS section.

* * * * *

UNITED STATES PATENT AND TRADEMARK OFFICE
CERTIFICATE OF CORRECTION

PATENT NO. : 7,304,606 B2
APPLICATION NO. : 10/760607
DATED : December 4, 2007
INVENTOR(S) : Ashutosh Pande et al.

It is certified that error appears in the above-identified patent and that said Letters Patent is hereby corrected as shown below:

On Page 1 of issued patent, add:

- line (62) Related U.S. Application Data: "This application is a continuation of 10/082,541 filed 2/21/2002, now US Patent 6,703,971, which claims the benefit of 60/270,682 filed 2/21/2001."

Signed and Sealed this
Twenty-third Day of October, 2012

David J. Kappos
*Director of the United States Patent and Trademark Office*